(12) United States Patent
Kim

(10) Patent No.: US 7,597,642 B2
(45) Date of Patent: Oct. 6, 2009

(54) DIFFERENTIAL PINION GEAR HAVING INTERIOR CIRCUMFERENCE FOR PREVENTING ABRASION

(75) Inventor: Dongwon Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/845,189

(22) Filed: Aug. 27, 2007

(65) Prior Publication Data

US 2008/0058150 A1 Mar. 6, 2008

(30) Foreign Application Priority Data

Aug. 31, 2006 (KR) .................. 10-2006-0083436

(51) Int. Cl.
 *F16H 57/04* (2006.01)
(52) U.S. Cl. .................. 475/160; 475/336; 74/467
(58) Field of Classification Search .................. 475/160, 475/230, 336, 159; 74/665 GB, 385, 395, 74/410, 411, 412 R, 417, 423, 467
See application file for complete search history.

(56) References Cited

U.S. PATENT DOCUMENTS

| 913,424 | A | * | 2/1909 | Nehring | 74/412 R |
|---|---|---|---|---|---|
| 3,633,441 | A | * | 1/1972 | Hicks | 475/334 |
| 4,643,284 | A | * | 2/1987 | Hardt et al. | 192/50 |
| 6,122,985 | A | * | 9/2000 | Altamura | 74/411 |
| 6,322,474 | B1 | * | 11/2001 | Hauser | 475/230 |
| 2007/0056400 | A1 | * | 3/2007 | Kennedy | 74/607 |

* cited by examiner

Primary Examiner—Roger L Pang
Assistant Examiner—Erin D Bishop
(74) Attorney, Agent, or Firm—Morgan, Lewis & Bockius LLP

(57) ABSTRACT

A differential pinion gear has a curved interior surface, defining a hole for a pinion shaft to be disposed therein. The hole is narrower at the center and wider at the ends. The interior surface may have a radius of curvature at the center of the hole that is larger than the radius of curvature at each of the ends of the hole. The hole may also include a chamfered portion at each end.

3 Claims, 2 Drawing Sheets

DIFFERENTIAL PINION GEAR HAVING INTERIOR CIRCUMFERENCE FOR PREVENTING ABRASION

CROSS-REFERENCE TO RELATED APPLICATION

This application claims priority to, and the benefit of, Korean Patent Application No. 10-2006-0083436, filed in the Korean Intellectual Property Office on Aug. 31, 2006, the entire contents of which are incorporated herein by reference.

BACKGROUND OF THE INVENTION (a) Field of the Invention

The present invention relates to a differential pinion gear having an abrasion-preventing interior surface.

(b) Description of the Related Art

Typically, a differential gear transmits driving torque from a transmission to an axle. The differential gear achieves smooth driving without fatiguing the wheels by regulating rotation speeds of the wheels.

A typical differential gear includes a drive gear, which receives torque from the transmission, and a differential case bolted to the drive gear. A pinion shaft is inserted to the differential case and a pair of pinion gears are rotatably engaged to the pinion shaft. A pair of side gears is coupled between the pinion gears and the axle such that the side gears transmit power from the pinion gear to the axle. The pinion gear and the pinion shaft need high contact fatigue strength and anti-abrasion properties to transmit the engine torque to the wheels.

Further, lubricant is provided on interior surface of the pinion gear. The lubricant may leak in the axial direction. Abrasion thus occurs to the pinion shaft, and if the abrasion is serious, adhesion may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

A differential pinion gear has a curved interior surface, defining a hole for a pinion shaft to be disposed therein. The hole is narrower at the center and wider at the ends.

The interior surface may have a radius of curvature at the center of the hole that is larger than the radius of curvature at each of the ends of the hole. The hole may also include a chamfered portion at each end.

DETAILED DESCRIPTION OF THE PREFERRED EMBODIMENTS

An exemplary embodiment of the present invention will hereinafter be described in detail with reference to the accompanying drawings.

Figure 1:
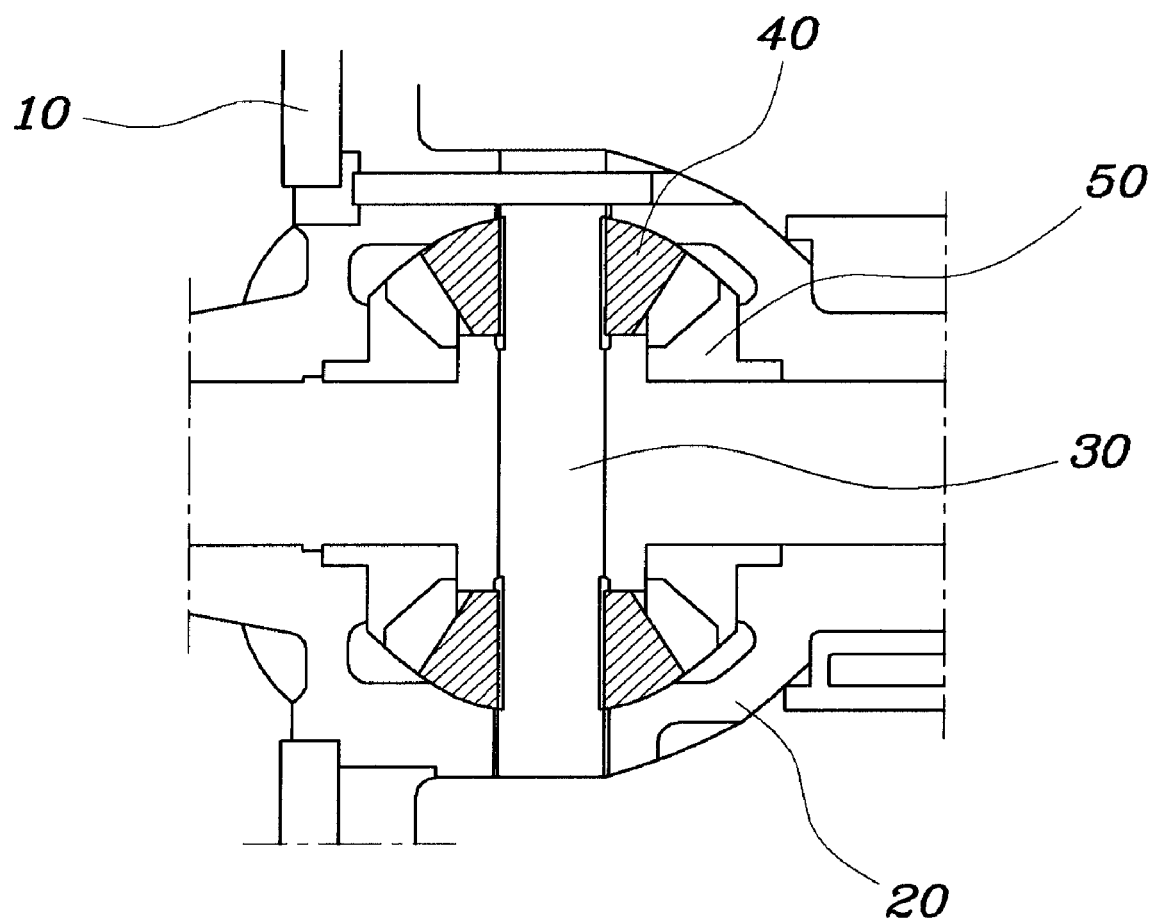
FIG. 1 is a cross-sectional view of a differential assembly according to an exemplary embodiment of the present invention.

A differential gear according to exemplary embodiments of the present invention, as shown in FIG. 1, includes a drive gear 10, which receives torque from a transmission (not shown), and a differential case 20 engaged to the drive gear 10. A pinion shaft 30 is disposed in the differential case 20 by a securing pin, and a pair of pinion gears 40 is rotatably engaged to the pinion shaft 30. A pair of side gears 50 is coupled between the pinion gears 40 and the axle (not shown) such that the side gears 50 transmit the power from the pinion gear 40 to the axle.

Lubricant is provided on interior surface of the pinion gear 40. The lubricant may leak in the axial direction (the vertical direction in the FIGS.).

Figure 2:
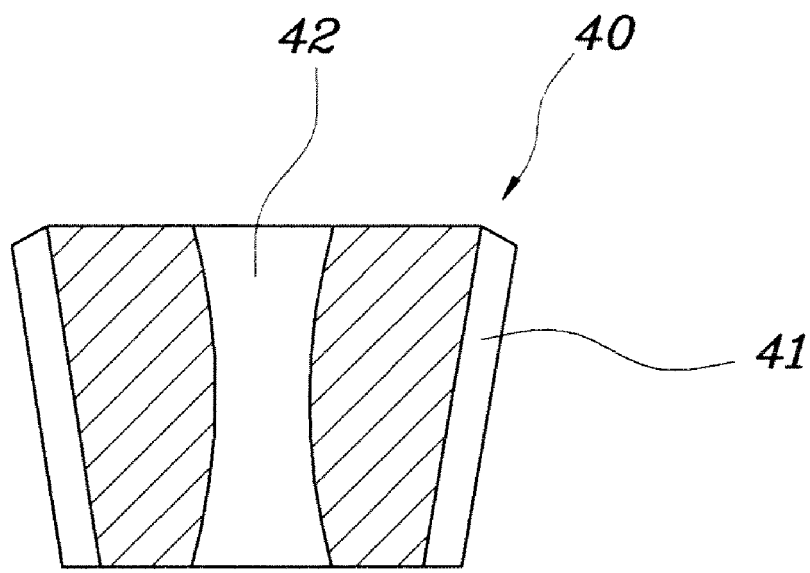
FIG. 2 is a cross-sectional view showing a differential pinion gear according to an exemplary embodiment of the present invention.
Figure 3:
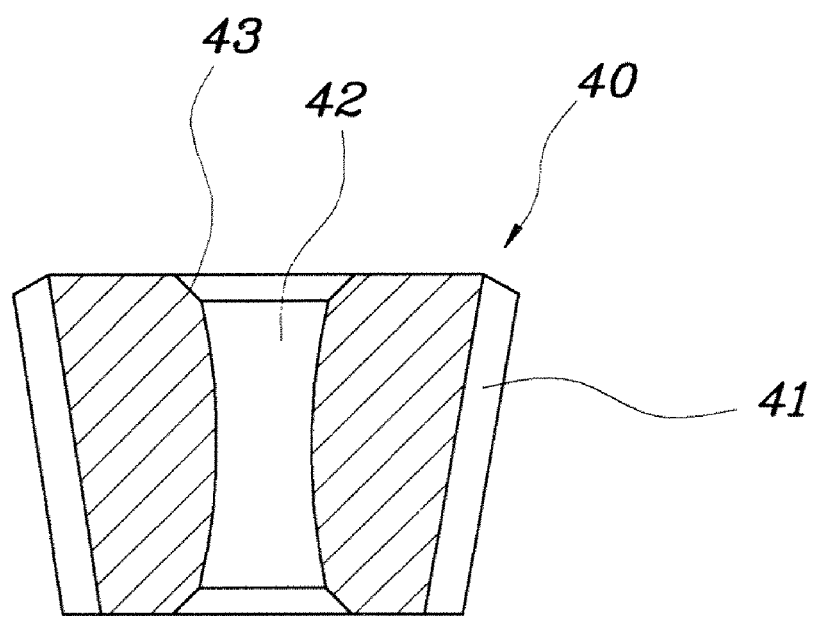
FIG. 3 is a cross-sectional view showing a differential pinion gear according to a further exemplary embodiment of the present invention.

Referring to FIGS. 2-3, the pinion gear 40 includes a gear portion 41 at its exterior surface, and an interior surface 42 in which the pinion shaft 30 is disposed. The interior surface 42 of the pinion gear 40 is curved as shown in FIGS. 2-3, such that it is wider at both ends than in the center. Therefore, deviation in oil film thickness between the interior surface 42 and the pinion shaft 30 is minimized.

In addition, the radius of curvature of the central portion of the interior surface 42 is larger than that of both end portions. In addition, a chamfered portion 43 may be provided on the end portions of the interior surface 42, such that the thickness of the oil film at the end portions of the interior surface 42 tends to be larger still.

Referring back to FIG. 1, the pinion shaft 30 is rotatably disposed in the pinion gear 40. Because of the shape of the surface 42, the oil film will tend to be thicker at the end portions than at the center. However, the oil film leaks in the axial direction. Therefore, deviation of the oil film thickness is minimized. Therefore, adhesion and abrasion between the pinion shaft 30 and the pinion gear 40 can be prevented.

As described, according to a differential pinion gear of an exemplary embodiment of the present invention, because the oil film thickness deviation is minimized although the oil film leaks to the edge in the axial direction, adhesion and abrasion by heat occurring during rotating can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus, comprising:
 a differential pinion gear comprising a curved interior surface, the interior surface defining a hole configured and dimensioned for a pinion shaft to be disposed therein so that the differential pinion gear is rotatable with respect to the pinion shaft, the hole comprising a center and two ends, wherein the hole is narrower at the center and relatively wider at the ends, such that the deviation of an oil film thickness within the hole is minimized when the differential pinion gear rotates around the pinion shaft.

2. The apparatus of claim 1, wherein the interior surface comprises a radius of curvature at each of the center and the ends of the hole, wherein the radius of curvature at the center of the hole is larger than the radius of curvature at each of the ends of the hole.

3. The apparatus of claim 1, wherein the hole further comprises a chamfered portion at each end.

* * * * *